United States Patent
Medvinsky et al.

(10) Patent No.: US 12,169,838 B2
(45) Date of Patent: Dec. 17, 2024

(54) COMMUNICATIONS SERVER APPARATUS, METHOD AND COMMUNICATIONS SYSTEM FOR MANAGING AUTHENTICATION OF A USER

(71) Applicant: GRABTAXI HOLDINGS PTE. LTD., Singapore (SG)

(72) Inventors: Gennady Medvinsky, Seattle, WA (US); Surya Anil Lingamallu, Seattle, WA (US); Alexander Yukhanov, Seattle, WA (US)

(73) Assignee: GRABTAXI HOLDINGS PTE. LTD., Singapore (SG)

( * ) Notice: Subject to any disclaimer, the term of this patent is extended or adjusted under 35 U.S.C. 154(b) by 0 days.

(21) Appl. No.: 17/800,956

(22) PCT Filed: Mar. 11, 2020

(86) PCT No.: PCT/SG2020/050125
§ 371 (c)(1),
(2) Date: Aug. 19, 2022

(87) PCT Pub. No.: WO2021/183040
PCT Pub. Date: Sep. 16, 2021

(65) Prior Publication Data
US 2023/0075741 A1    Mar. 9, 2023

(51) Int. Cl.
G06Q 20/00      (2012.01)
G06Q 20/40      (2012.01)

(52) U.S. Cl.
CPC ..... *G06Q 20/4014* (2013.01); *G06Q 20/4016* (2013.01); *G06Q 20/4093* (2013.01)

(58) Field of Classification Search
CPC .......... G06Q 20/4014; G06Q 20/4016; G06Q 20/4093
(Continued)

(56) References Cited

U.S. PATENT DOCUMENTS 7,086,085 B1    8/2006    Brown et al.
10,200,364 B1    2/2019    Ketharaju et al.
(Continued)

FOREIGN PATENT DOCUMENTS

CN    102768743    11/2012
WO    WO-2018/007823    1/2018
(Continued)

OTHER PUBLICATIONS

WikipediA "Session (computer science)", https://en.wikipedia.org/w/index.php?title=Session_(computer_science)&oldid=908513141, Jul. 30, 2019, (5 pages).
(Continued)

*Primary Examiner* — Dante Ravetti
(74) *Attorney, Agent, or Firm* — Buckley, Maschoff & Talwalkar LLC

(57) ABSTRACT

A communications server apparatus for managing authentication of a user based on one or more authentication events in a session is provided, to, in one or more data records, generate, for each authentication event, data indicative of a trust score corresponding to the authentication event; and generate, data indicative of a security score based on the trust scores corresponding to the one or more authentication events in the session, and, in response to receiving request data indicative of an authentication request associated with the user corresponding to a transaction in the session, the transaction having a value indicator, authenticate the user if the security score satisfies a condition for authentication corresponding to the transaction according to the value indicator, wherein security scores for satisfying the condition are variable according to value indicators of transactions.

23 Claims, 3 Drawing Sheets

(58) Field of Classification Search
USPC .......................... 705/16, 21, 59; 380/44, 262
See application file for complete search history.

(56) References Cited

U.S. PATENT DOCUMENTS

| | | | |
|---|---|---|---|
| 2011/0179477 A1 | 7/2011 | Starnes et al. | |
| 2013/0191898 A1* | 7/2013 | Kraft | G06F 21/31 |
| | | | 726/6 |
| 2013/0227700 A1 | 8/2013 | Dhillon et al. | |
| 2014/0325220 A1 | 10/2014 | Tunnell et al. | |
| 2014/0366111 A1 | 12/2014 | Sheller et al. | |
| 2015/0089568 A1 | 3/2015 | Sprague et al. | |
| 2015/0242601 A1 | 8/2015 | Griffiths et al. | |
| 2016/0330178 A1 | 11/2016 | Sprague et al. | |
| 2017/0140141 A1 | 5/2017 | Yan et al. | |
| 2018/0004961 A1 | 1/2018 | Gil et al. | |
| 2018/0012005 A1 | 1/2018 | Hallock | |
| 2018/0082052 A1 | 3/2018 | Swart et al. | |
| 2018/0139606 A1 | 5/2018 | Green et al. | |
| 2018/0309792 A1 | 10/2018 | Obaidi | |
| 2018/0341758 A1 | 11/2018 | Park et al. | |
| 2019/0058700 A1 | 2/2019 | Kurian et al. | |
| 2019/0268321 A1 | 8/2019 | Kim et al. | |

FOREIGN PATENT DOCUMENTS

| | | |
|---|---|---|
| WO | WO-2019/029818 | 2/2019 |
| WO | WO-2019/168383 | 9/2019 |

OTHER PUBLICATIONS

WikipediA, "Identity management", https://en.wikipedia.org/w/index.php?title=Identity_management&oldid=912555838, Aug. 26, 2019 (9 pages).

Written Opinion for Application No. PCT/SG2020/050125, mailed Jul. 13, 2020, (5 pages).

International Search Report for Application No. PCT/SG2020/050125, mailed Jul. 13, 2020, (4 pages).

* cited by examiner

COMMUNICATIONS SERVER APPARATUS, METHOD AND COMMUNICATIONS SYSTEM FOR MANAGING AUTHENTICATION OF A USER

TECHNICAL FIELD

The invention relates generally to the field of communications. One aspect of the invention relates to a communications server apparatus for managing authentication of a user based on one or more authentication events in a session. Other aspects of the invention relate to a method for managing authentication of a user based on one or more authentication events in a session, and a communications system for managing authentication of a user based on one or more authentication events in a session.

One aspect of the invention has particular, but not exclusive, application to authenticating a user for a transaction based on authentication event(s) occurring in a session. Authentication may be based on computing a security score on the basis of trust scores associated with the authentication event(s). If the security score is determined to satisfy the condition for authentication for the transaction based on the value indicator associated with the transaction, the user is authenticated and allowed to perform the transaction.

BACKGROUND

IDs (Identifications) for a platform/system administered by a service provider provides login and registration capabilities to allow various respective users access to the services provided by the service provider. The platform can support multiple authentication mechanisms for the users to gain access. As the platform matures, the authentication requirements have evolved too. For certain scenarios like payments and profile updates, additional security is needed. That's when, for example, second factor authentication was added. There are a number of services that handle user data and perform higher value transactions on behalf of the user. The use cases of these services can translate to different authentication requirements, which can cause challenging issues to the platform in determining whether to allow access.

There is therefore need for techniques of evaluating a user's authenticated state prior to allowing the user access to the services.

SUMMARY

Aspects of the invention are as set out in the independent claims. Some optional features are defined in the dependent claims.

Implementation of the techniques disclosed herein may provide significant technical advantages. Authentication of a user may be based on trust scores of one or more authentication events associated with the user during a session (e.g., a login session). A security score may be computed based on trust scores accumulated during the session. Different trust scores may be provided for different types of authentication events, based on the security level or "complexity" associated with the authentication events. For example, an authentication event with a higher degree of security (e.g., one that involves a 12-character password response versus another that involves a 6-character password response) may be assigned a higher trust score, thus, representing a higher confidence level in the authentication event.

Implementation of the techniques disclosed herein may also provide that further authentication event(s) may not be required for the transaction if the security score that has been determined remains sufficient for authentication of the user for the transaction.

In at least some implementations, the techniques disclosed herein may provide for degradation of the trust scores over time, meaning that a trust score that is initially assigned to an authentication event may decrease with the passage of time. As such, the degraded trust score of an authentication event may have less effect on the security score to reduce any risk owing to uncertainty or any adverse event that might occur since the time of occurrence of the authentication event that might compromise the integrity of the session.

In at least some implementations, the techniques disclosed herein allow for trust scores of all authentication events in the session to be taken into consideration for determining the security score. Alternatively, in some implementations, the trust scores of one or more authentication events during the session may not be considered if the associated authentication events are considered to be of a low level of confidence (e.g., one that involves a simple response, say, a 4-character password response).

In an exemplary implementation, the functionality of the techniques disclosed herein may be implemented in software running on a handheld communications device, such as a mobile phone. The software which implements the functionality of the techniques disclosed herein may be contained in an "app"—a computer program, or computer program product—which the user has downloaded from an online store. When running on the, for example, user's mobile telephone, the hardware features of the mobile telephone may be used to implement the functionality described below, such as using the mobile telephone's transceiver components to establish the secure communications channel for managing authentication of a user based on one or more authentication events in a session.

BRIEF DESCRIPTION OF THE DRAWINGS

The invention will now be described, by way of example only, and with reference to the accompanying drawings in which.

DETAILED DESCRIPTION

Figure 1:
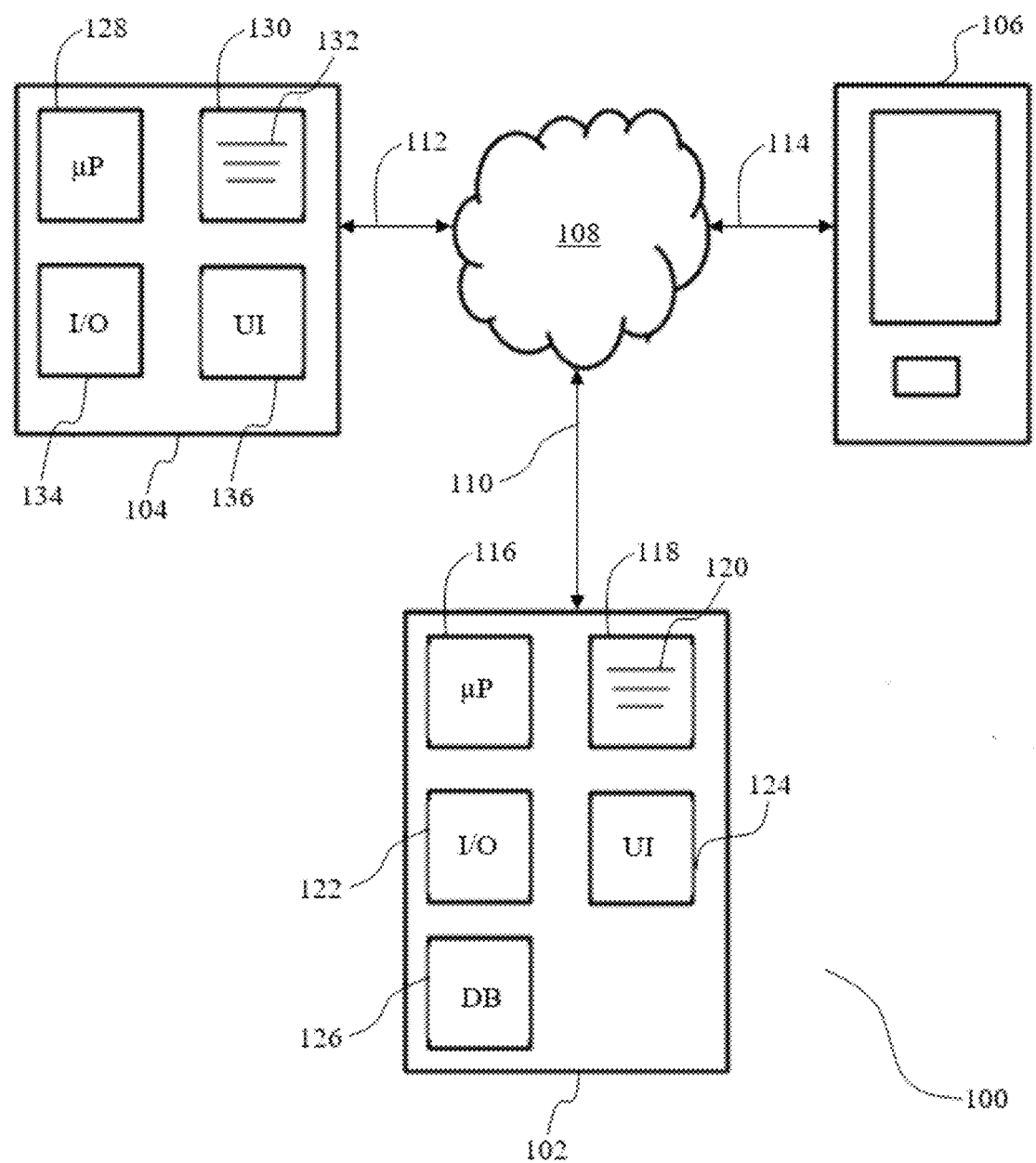
FIG. 1 is a schematic block diagram illustrating an exemplary communications system involving a communications server apparatus.

Various embodiments may relate to policy driven evaluation for the lifecycle of an authenticated session. This may involve taking into account, one or more or all authentication events (e.g., password based, PIN, biometrics, question/answer, etc.) for a given session over time, and provide an evaluation of each event, e.g., in the form of trust score or value (for example, a numerical value, e.g., from 1 to 10 although other suitable ranges may also be used).

A service provider may provide one or more services to different types of users. Put in another way, users may perform one or more transactions administered by or associated with a service provider. For example, a service provider for transport-related services (e.g., transportation, logistics, delivery, etc.) may have first-party users such as passengers, drivers and merchants. IDs for a platform/ system administered by the service provider may provide login and registration capabilities to allow the various users access to the services provided by the service provider. It may support multiple authentication mechanisms, including but not limited to, phone numbers, social numbers, and username-password, across multiple applications. At the end of successful authentication, the ID generates a session JWT (JSON (JavaScript Object Notation) Web Token). A JWT is a standards based token used to prove the identity of the user on subsequent calls made by, for example, the service provider's apps on behalf of the user. As the platform matures or develops, the authentication requirements may also evolve. For certain scenarios such as, but not limited to, payments and profile updates, additional security may be needed, where second factor authentication may be employed for extra security. In the techniques disclosed herein, the ID may support authentication based on one or more of PIN, selfie, biometric and context based challenges such as balance amount (e.g., account balance, in-app balance, eWallet balance, etc.), and ride history. As the platform develops, a web of multiple micro services may be provided. There are a number of services that handle user data and perform higher value transactions on behalf of the user. The use cases of these services can translate to different authentication security grade requirements. The hub of multiple service interactions may need a (central) way of evaluating a user's authenticated state. The techniques disclosed herein may enable evaluation of a user's authenticated state, including, the user's authenticated state as it evolves over time (e.g., there may be new second factor authentication events, decay in the value of authentication event with progression of time, etc.), and understanding security assertions performed by an upstream service when executing a multi-step logical transaction.

In a given (login) session, a user may perform one or more authentication challenges and complete authentication events/mechanisms, for example, by way of password, one-time password (OTP) sent via SMS (short message service), PIN, biometrics (e.g., finger print, voice recognition, facial recognition), question/answer, information relating to the account history of a user (e.g., for an account associated with transport-related services, the user may be prompted to select n out of m locations where the user took a ride), etc. The authentication events, along with the time the events occur (i.e., time stamps), may be continuously recorded over time during the session, as and when new authentication events occur. As such, there is accumulated authentication session data. An authentication event refers to a combination of an authentication challenge and the response provided to the challenge.

Each authentication event is given a value, which may degrade (i.e., reduce) over time. Different authentication events may be given different values, and the associated degradation in the values may also be different, which may be governed by a policy-based mechanism. The time that the authentication occurred may affect the value and the degradation thereof. For example, a PIN entered 12 hours ago may be assigned an associated 0 value, while a PIN entered 1 hour ago may be assigned an associated 0.5 value. The relative strength of the authentication mechanism may also have an effect on the value. For example, a 12-character password that is entered by a user may have an associated higher value compared to, for example, an answer given by the user to an authentication request asking for the user's current location.

The techniques may then determine the security grade or score for the (login) session based on the accumulated authentication session data, i.e., on the basis of the trust scores of the various authentication events during the session. One simplistic example of determining the final security score or value is to compute the sum of the various trust scores of the authentication events, but there can be many different types of heuristics, i.e., more sophisticated algorithms (e.g., using a linear regression time series) that may be applicable. It should be appreciated that system owners may not be restricted to specific algorithm and they may choose to plug in their algorithms and employ an algorithm that may be more suited to their requirements/applications, and/or that may produce better results. The security score may be computed dynamically (computed based on data recorded in the authentication session state) each time a caller (e.g., a relying system or service (e.g., payment service) requesting the security score for a given user's authentication session) asks for it. Alternatively, the security score may be cached and the cached value may have a TTL (time to live) after which it expires (i.e., the security score becomes invalid) and may be automatically deleted from the cache. During the time the cached value remains valid, instead of re-computing the security score again during this validity period, a cache look up may be performed, and as there is already a security score (that is still valid) in the cache, the cached value is returned.

A higher security score indicates a higher security confidence in the identity of the user and, as a result, the request made by the user (e.g., to access a service or perform a transaction) may be granted. If the security score is below a certain threshold value, the user may be required to complete another authentication event to increase the score, e.g., by proving knowledge of a PIN or password for a particular service.

Different (login) sessions, with their respective accumulated authentication session data, may be independent from each other. For example, a user logs into a (first) session, completes a number of authentication events, and then logs out, and subsequently, a while later, the same user logs into another session (i.e., second session). The authentication session data accumulated during the first session is not used for the purpose of computing the security score for the second session.

As described above, in various embodiments, a security score may be evaluated using authentication data accumulated over time to determine if the current authentication session is strong enough so as to continue giving, to the user, access to target endpoint or transaction (e.g., transfer funds), or to challenge the user for additional authentication.

As used herein, a "session" may allow for information interchange between two or more communicating devices, or between a computer and user. A session may define a period of time for the information interchange, being established at one time point and ended at a later time point. As such, a session can be temporarily set up to enable exchange of information between different parties. During a session, a user may access one or more applications or services or perform transactions. In the context of various embodiments, a session may refer to a login session.

The techniques disclosed herein may provide a (centralised) means for one or more of the following:

(i) Keeping track of authentication challenges performed by the user over time in a given login session. In various embodiments, an authentication service keeps server side state (e.g., in a redis cache) which is a record that may be looked up based on session identifiers. The authentication service may be the Identity Service 380 (FIG. 3) to be described further below. Authentication events, along with their corresponding time stamp at which they occurred, may be kept in this record. The record may be considered as per session log in which the authentication service continues to record the authentication events.

(ii) Evaluating security grade of a login session based on accumulated authentication state. In various embodiments, the term "security grade" refers to a score, for example, on a scale of 0 to 1 (although other suitable ranges may also be used). A score of 0.9 may indicate high security confidence in the identity of the given principal or user. The term "authentication state" may mean the server side record for each session as described above. The term "accumulated authentication state" may mean the authentication events are recorded over time, in a manner similar to a log where authentication events are being added to. An example of a recording of an authentication event is <pin_auth, timetamp>.

(iii) Providing capability to make scenario specific authentication decisions. As a non-limiting example, in order to view credit card information on an account, for the current authenticated session, the user may have to prove knowledge of a PIN. The requesting service may identify a challenge via a random number, where that random number (e.g., challenge_id) may be recorded as part of the record (in session state), e.g., <pin_auth, challenge_id, timestamp>. The relying service may then present the challenge id, to confirm that not only the PIN was entered recently but it was in response to a particular action (like viewing credit card information) and not something else.

(iv) Providing a general abstraction for multiple authentication mechanisms. An interface may be provided on top of the session state that can answer questions about the relative security strength and various events that occurred throughout the lifetime of a session Referring first to FIG. 1, a communications system 100 is illustrated, which may be applicable in various embodiments. The communications system 100 includes a communications server apparatus 102, a first user (or client) communications device 104 and a second user (or client) communications device 106. These devices 102, 104, 106 are connected in or to the communications network 108 (for example, the Internet) through respective communications links 110, 112, 114 implementing, for example, internet communications protocols. The communications devices 104, 106 may be able to communicate through other communications networks, such as public switched telephone networks (PSTN networks), including mobile cellular communications networks, but these are omitted from FIG. 1 for the sake of clarity. It should be appreciated that there may be one or more other communications devices similar to the devices 104, 106.

The communications server apparatus 102 may be for managing authentication of a user based on one or more authentication events in a session.

The communications server apparatus 102 may be a single server as illustrated schematically in FIG. 1, or have the functionality performed by the communications server apparatus 102 distributed across multiple server components. In the example of FIG. 1, the communications server apparatus 102 may include a number of individual components including, but not limited to, one or more microprocessors (μP) 116, a memory 118 (e.g., a volatile memory such as a RAM (random access memory)) for the loading of executable instructions 120, the executable instructions 120 defining the functionality the server apparatus 102 carries out under control of the processor 116. The communications server apparatus 102 may also include an input/output (I/O) module 122 allowing the server apparatus 102 to communicate over the communications network 108. User interface (UI) 124 is provided for user control and may include, for example, one or more computing peripheral devices such as display monitors, computer keyboards and the like. The communications server apparatus 102 may also include a database (DB) 126, the purpose of which will become readily apparent from the following discussion.

The user communications device 104 may include a number of individual components including, but not limited to, one or more microprocessors (μP) 128, a memory 130 (e.g., a volatile memory such as a RAM) for the loading of executable instructions 132, the executable instructions 132 defining the functionality the user communications device 104 carries out under control of the processor 128. User communications device 104 also includes an input/output (I/O) module 134 allowing the user communications device 104 to communicate over the communications network 108. A user interface (UI) 136 is provided for user control. If the user communications device 104 is, say, a smart phone or tablet device, the user interface 136 may have a touch panel display as is prevalent in many smart phone and other handheld devices. Alternatively, if the user communications device 104 is, say, a desktop or laptop computer, the user interface may have, for example, one or more computing peripheral devices such as display monitors, computer keyboards and the like.

The user communications device 106 may be, for example, a smart phone or tablet device with the same or a similar hardware architecture to that of the user communications device 104.

Figure 2A:
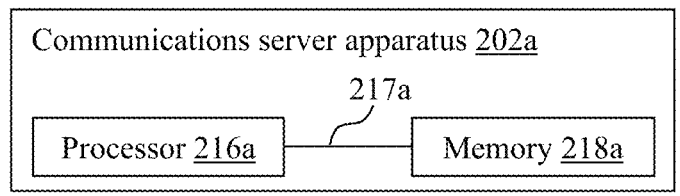
FIG. 2A shows a schematic block diagram illustrating a communications server apparatus for managing authentication of a user based on one or more authentication events in a session.
Figure 2B:
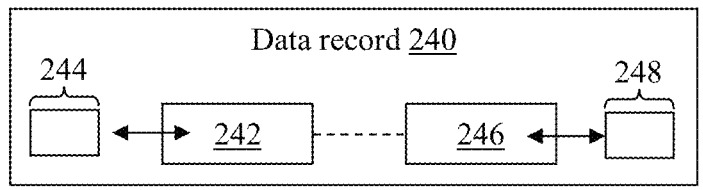
FIG. 2B shows a schematic block diagram illustrating a data record.

FIG. 2A shows a schematic block diagram illustrating a communications server apparatus 202a for managing authentication of a user based on one or more authentication events in a session, while FIG. 2B shows a schematic block diagram illustrating a data record 240.

The communications server apparatus 202a includes a processor 216a and a memory 218a, where the communications server apparatus 202a is configured, under control of the processor 216a to execute instructions in the memory 218a to, in one or more data records 240 including one or more event data fields 242a and one or more score data fields 246, generate, for the one or more event data fields 242a and for each authentication event, data 244 indicative of a trust score corresponding to the authentication event, and generate, for the one or more score data fields 246, data 248 indicative of a security score based on the trust scores corresponding to the one or more authentication events in the session, and, in response to receiving request data indicative of an authentication request associated with the user corresponding to a transaction in the session, the transaction having a value indicator, authenticate the user if the security score satisfies a condition for authentication corresponding to the transaction according to the value indicator, wherein security scores for satisfying the condition are variable according to value indicators of transactions. The processor 216a and the memory 218a may be coupled to each other (as represented by the line 217a), e.g., physically coupled and/or electrically coupled. The processor 216a may be as described in the context of the processor 116 (FIG. 1) and/or the memory 218a may be as described in the context of the memory 118 (FIG. 1).

In other words, there may be provided a communications server apparatus 202a for managing authentication of a user based on one or more authentication events (associated with the user) in a session (e.g., a login session). The server apparatus 202a may, in one or more data records 240 having one or more event data fields 242 and one or more score data fields 246, generate, for (or in) the one or more event data fields 242 and for each authentication event, data 244 indicative of a trust score corresponding to the authentication event, and, also, generate, for (or in) the one or more score data fields 246, data 248 indicative of a security score (or final score) based on the trust scores corresponding to the one or more authentication events in the lifetime of the session. The one or more data records 240 may be associated with or accessible by the communications server apparatus 202a. The one or more data records 240 may be generated by the communications server apparatus 202a. The one or more data records 240 may be modified or updated by the communications server apparatus 202a. The one or more data records 240 may be stored at the communications server apparatus 202a, e.g., in the memory 218a.

A respective event data field 242 may be associated with a respective authentication event, meaning that data corresponding to the respective authentication event may be included in the respective event data field 242. Data corresponding to the respective authentication event may include a timestamp of the authentication event (meaning the time related to the authentication event), and/or a type of the authentication event, for example, the type of challenge-response test. The data 244 indicative of a trust score corresponding to a respective authentication event may be provided in or associated with a respective event data field 242.

In response to receiving request data indicative of an authentication request associated with the user corresponding to a transaction in the session, the transaction having a value indicator, the communications server apparatus 202a may authenticate the user provided that the security score that is computed satisfies a condition for authentication corresponding to the transaction based on the corresponding value indicator of the transaction. Security scores for satisfying the condition may be different according to (or based on) value indicators of transactions (e.g., a higher security score may be required to satisfy the condition for a transaction having a higher value indicator).

In the context of various embodiments, an authentication request may refer to a request for authentication of a user, for example, in response to the user attempting to perform a transaction. The authentication request may include data indicative of the transaction to be carried out.

In the context of various embodiments, an authentication event may include a challenge-response (authentication) test, and may refer to a combination of a challenge-response test provided to a user, and user data indicative of the (expected or correct or successful) response provided by the user to the challenge-response test.

Authentication events may be different in types, for example, in terms of the responses required. The different types of authentication events may refer to, but not limited to, authentication events involving passwords, authentication events involving pins, authentication events involving biometrics, authentication events involving questions/answers, etc.

The trust score corresponding to an authentication event may be indicative or reflective of the strength or robustness or level of security of the authentication event, for example, in relation to the associated challenge-response test. A higher or better trust score may indicate a higher degree of security or authentication associated with the authentication event. For example, a trust score for an authentication event involving a 12-character password may be higher than a trust score for an authentication event involving a 6-character password. In the context of various embodiments, a trust score may be in the form or may be defined by a value, for example, a value in the range of 0-1, 0-100, or any suitable ranges.

In various embodiments, as a non-limiting example, computation of the security score may be by way of summing the trust scores. However, many different type of heuristics or algorithms may be used, e.g., using a linear regression time series.

As the security score is determined based on the trust scores of the one or more authentication events in the session, the security score, therefore, is determined based on accumulated authentication data in the session. The security score may be indicative or reflective of the level or degree in the reliability or confidence in the identity of the user. A higher or better security score may indicate a higher degree of confidence in the identity of the user. In the context of various embodiments, a security score may be in the form or may be defined by a value, for example, a value in the range of 0-1, 0-100, or any suitable ranges.

In various embodiments, the security score may be cached with an associated TTL (time to live) after which it expires (i.e., the security score becomes invalid).

In various embodiments, the security score may be dynamically computed each time in response to an authentication request.

The communications server apparatus 202a may determine whether the security score satisfies the condition for authentication corresponding to the transaction, e.g., by comparing the security score to a threshold level associated with the value indicator of the transaction. As a non-limiting example, the condition for authentication may be that the security score is equal to or higher than the threshold level. A higher security score may indicate a higher degree of confidence in the identity of the user as proven by the successful authentication of the user as determined via the one or more authentication events in the session. Different threshold levels may correspond to different value indicators. This may mean that the sufficiency of the security score that is determined may depend on the value indicator of the corresponding transaction. For example, a lower threshold value for the security score may be imposed as the condition for authentication for a lower value transaction such as making a booking for a service, while a higher threshold value for the security score may be imposed as the condition for authentication for a higher value transaction such as one that involves a financial transaction, e.g., making a payment.

In other words, different transactions may have different value indicators, and, therefore, different security scores or values may be required to satisfy the conditions for authentication corresponding to the different transactions. For example, a transaction with a higher value indicator (e.g., a high value transaction) such as transferring money or making a payment may require a higher security score to satisfy the condition for authentication, while a transaction with a lower value indicator (e.g., a low value transaction) such as logging into a service or making a booking for a service may require a lower security score to satisfy the condition for authentication. This may mean that the prevailing or current security score that is obtained may or may not satisfy the condition for authentication depending on the value indicator corresponding to the transaction requiring the authentication. As a non-limiting example, a security score of, say, 3 that is obtained may be sufficient to satisfy the condition for authentication for a low value transaction which may require a corresponding security score of 2 for authentication, but may not be enough for a high value transaction which may require a corresponding security score of 4.

If the security score satisfies the condition or passing grade for authentication, the user may be authenticated for the transaction. Further, the user may not need to be further challenged in an additional authentication event for the transaction, as long as the security score satisfies the corresponding condition for authentication. The communications server apparatus 202a may transmit, for receipt by a communications device of the user, data indicative of the (successful) authentication of the user.

In the context of various embodiments, a transaction may include, but not limited to, logging into a service, signing up or registering for a service, accessing a service, making a payment, managing a financial transaction, viewing account details, making a booking for a service (e.g., transport-related services, delivery services, logistics), making changes to details (including user details), etc.

If the security score fails to satisfy the condition for authentication, the communications server apparatus 202a may generate data indicative of an authentication challenge for the transaction, and transmit the data indicative of the authentication challenge to a communications device of the user for a response from the user to the authentication challenge, and, in response to receiving data indicative of the response to the authentication challenge from the communications device, the communications server apparatus may, in the one or more data records 240, generate, for (or in) the one or more event data fields 242, data 244 indicative of a trust score corresponding to another authentication event defined by the authentication challenge and the response, and, generate, for (or in) the one or more score data fields 246, data 248 indicative of another security score (or final score) based on the trust scores corresponding to the one or more authentication events and the trust score corresponding to the other authentication event, and authenticate the user if the other security score satisfies the condition for authentication corresponding to the transaction according to the value indicator of the transaction.

In various embodiments, for generating the security score, the communications server apparatus 202a may generate data 248 indicative of the security score based on the trust scores corresponding to all authentication events in the session. In other words, the security score may be computed based on all authentication events in or during the lifetime of the session, not just one or a portion of the authentication events in the session. As such, the security score may be determined based on all accumulated authentication data in the session.

In various embodiments, the security score may be independent of authentication events in another session. In other words, the security score may be independent from authentication events and their associated trust scores in another session, meaning that authentication events and computation of the security score in one session may be independent from the authentication events and computation of the security score in another session.

In various embodiments, the communications server apparatus 202a may generate, for the one or more event data fields 242 and for each authentication event, data indicative of a timestamp of the authentication event.

In various embodiments, the trust scores may be different for different types of authentication events. In other words, the trust scores or values may differ depending on the types of authentication events.

In various embodiments, for each trust score, there may be degradation of the trust score over time (e.g., since the occurrence of the corresponding authentication event), and, for generating the data 244 indicative of the trust score, the communications server apparatus 202a may generate data indicative of the degraded trust score, and, for generating the data 248 indicative of the security score, the communications server apparatus 202 may generate data 248 indicative of the security score based on the degraded trust scores. This may mean, for example, that the value of the trust score for a corresponding authentication event may decrease over time, as time passes since the occurrence of the corresponding authentication event. As a non-limiting example, the trust score for an authentication event that just occurred may be 1, but as time passes, the trust score for the authentication event may degrade, for example, to 0.5 after 2 hours.

The manner of degradation of the trust scores may be provided for or set as part of policies, which may be customised according to applications. As a non-limiting example, a trust score, in the communications server apparatus, may continue to degrade with time. For example, where a trust score of 1 has been assigned to an authentication event, the trust score may degrade to 0.8 at the 1-hour mark after occurrence of the authentication event (even when there is no new authentication request), and then further may degrade to 0.5 at the 2-hour mark after occurrence of the authentication event (whether or not there is a new authentication request at this 2-hour mark).

As a further non-limiting example, where a trust score of 1 has been assigned to an authentication event, this trust score may instead be held at the same value in the communications server apparatus until there is a new authentication request. For example, the trust score may be held constant at 1, and does not reduce at the 1-hour mark after occurrence of the authentication event if no authentication request is made at this 1-hour mark. Subsequently, when a new authentication request is made at the 2-hour mark after occurrence of the authentication event, the trust score may degrade from 1 to 0.5 at this 2-hour mark.

The rates of degradation of the trust scores may be different for different types of authentication events. In other words, the rates at which the trust scores or values may degrade differ depending on the types of authentication events.

In various embodiments, the communications server apparatus 202a may further generate, for (or in) the one or more score data fields 246, data indicative of a validity period for the security score. The validity period may refer to the time or duration during which the security score may be or may remain valid.

In various embodiments, in response to receiving request data indicative of a subsequent authentication request associated with the user corresponding to a subsequent transaction in the session within the validity period, the communications server apparatus 202a may further retrieve the security score, and authenticate the user if the security score satisfies a condition for authentication corresponding to the subsequent transaction according to a value indicator of the subsequent transaction. This may mean that if the security score remains valid at the time of the subsequent authentication request, the valid security score may be returned, instead of re-calculation of a new security score.

In various embodiments, the communications server apparatus 202a may, in response to receiving another request data indicative of another (subsequent) authentication request associated with the user corresponding to another transaction in the session, authenticate the user if the security score satisfies a condition for authentication corresponding to the other transaction according to a value indicator of the other transaction (without requiring a subsequent authentication event).

In the context of various embodiments, the communications server apparatus 202a may be a single server, or have the functionality performed by the communications server apparatus 202a distributed across multiple server components.

Figure 2C:
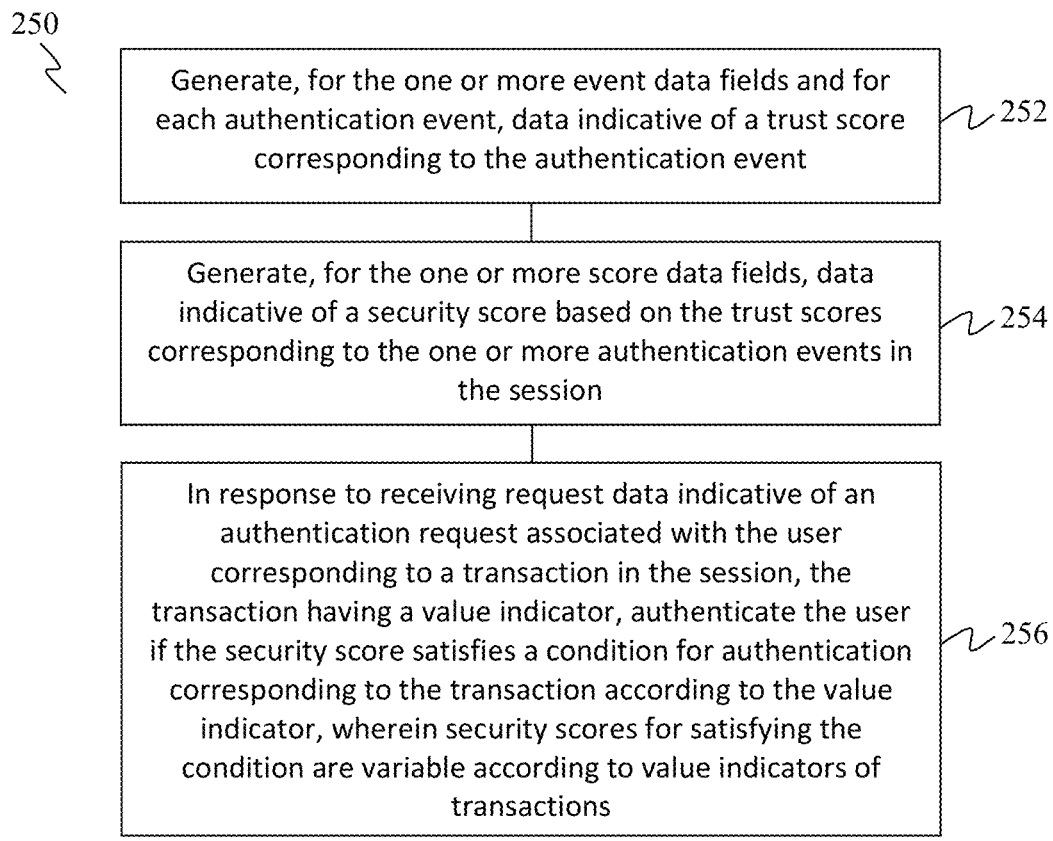
FIG. 2C shows a flow chart illustrating a method performed in a communications server apparatus for managing authentication of a user based on one or more authentication events in a session.

FIG. 2C shows a flow chart 250 illustrating a method, performed in a communications server apparatus for managing authentication of a user based on one or more authentication events in a session.

In one or more data records having one or more event data fields and one or more score data fields, at 252, for the one or more event data fields and for each authentication event, data indicative of a trust score corresponding to the authentication event is generated, and at 254, for the one or more score data fields, data indicative of a security score is generated based on the trust scores corresponding to the one or more authentication events in the session.

At 256, in response to receiving request data indicative of an authentication request associated with the user corresponding to a transaction in the session, the transaction having a value indicator, the user is authenticated if the security score satisfies a condition for authentication corresponding to the transaction according to the value indicator, wherein security scores for satisfying the condition are variable according to (or based on) value indicators of transactions.

If the security score fails to satisfy the condition for authentication, the method further includes generating data indicative of an authentication challenge for the transaction, and transmitting the data indicative of the authentication challenge to a communications device of the user for a response from the user to the authentication challenge, and, in response to receiving data indicative of the response to the authentication challenge from the communications device, the method further comprises, in the one or more data records, generating, for the one or more event data fields, data indicative of a trust score corresponding to another authentication event defined by the authentication challenge and the response, and generating, for the one or more score data fields, data indicative of another security score based on the trust scores corresponding to the one or more authentication events and the trust score corresponding to the other authentication event, and authenticating the user if the other security score satisfies the condition for authentication corresponding to the transaction according to the value indicator.

In various embodiments, at 254, data indicative of the security score may be generated based on the trust scores corresponding to all authentication events in the session.

In various embodiments, the security score may be independent of authentication events in another session.

The method may further include generating, for the one or more event data fields and for each authentication event, data indicative of a timestamp of the authentication event.

In various embodiments, the trust scores may be different for different types of authentication events.

In various embodiments, for each trust score, there may be degradation of the trust score over time (from occurrence of the authentication event in response to a corresponding authentication request), and, at 252, data indicative of the degraded trust score may be generated, and, at 254, data indicative of the security score may be generated based on the degraded trust scores. The rates of degradation of the trust scores may be different for different types of authentication events.

The method may further include generating, for the one or more score data fields, data indicative of a validity period for the security score.

In various embodiments, in response to receiving request data indicative of a subsequent authentication request associated with the user corresponding to a subsequent transaction in the session within the validity period, the method may further include retrieving the security score, and authenticating the user if the security score satisfies a condition for authentication corresponding to the subsequent transaction according to a value indicator of the subsequent transaction.

In various embodiments, in response to receiving another request data indicative of another (subsequent) authentication request associated with the user corresponding to another transaction in the session, the method may further include authenticating the user if the security score satisfies a condition for authentication corresponding to the other transaction according to a value indicator of the other transaction (without requiring a subsequent authentication event).

It should be appreciated that descriptions in the context of the communications server apparatus 202a may correspondingly be applicable in relation to the method as described in the context of the flow chart 250, and vice versa.

There may also be provided a computer program product having instructions for implementing the method for managing authentication of a user based on one or more authentication events in a session as described herein.

There may also be provided a computer program having instructions for implementing the method for managing authentication of a user based on one or more authentication events in a session as described herein.

There may further be provided a non-transitory storage medium storing instructions, which, when executed by a processor, cause the processor to perform the method for managing authentication of a user based on one or more authentication events in a session as described herein.

Various embodiments may further provide a communications system for managing authentication of a user based on one or more authentication events in a session, having a communications server apparatus, at least one user communications device and communications network equipment operable for the communications server apparatus and the at least one user communications device to establish communication with each other therethrough, wherein the at least one user communications device includes a first processor and a first memory, the at least one user communications device being configured, under control of the first processor, to execute first instructions in the first memory to transmit, for receipt by the communications server apparatus for processing, request data indicative of an authentication request associated with the user (of the at least one user communications device) corresponding to a transaction in the session, wherein the transaction has a value indicator, and wherein the communications server apparatus includes a second processor and a second memory, the communications server apparatus being configured, under control of the second processor, to execute second instructions in the second memory to, in one or more data records having one or more event data fields and one or more score data fields, generate, for the one or more event data fields, data indicative of a trust score corresponding to a respective authentication event, and generate, for the one or more score data fields, data indicative of a security score based on the trust scores corresponding to the one or more authentication events in the session, and, in response to receiving data indicative of the request data, authenticate the user if the security score satisfies a condition for authentication corresponding to the transaction according to the value indicator, wherein security scores for satisfying the condition are variable according to (or based on) value indicators of transactions. The communications server apparatus may transmit, for receipt by the at least one user communications device, data indicative of the (successful) authentication of the user.

If the security score fails to satisfy the condition for authentication, the communications server apparatus may generate data indicative of an authentication challenge for the transaction, and transmit the data indicative of the authentication challenge to the at least one user communications device for a response from the user to the authentication challenge, and, the at least one user communications device may, in response to the user responding to the authentication challenge, transmit data indicative of the response to the authentication challenge to the communications server apparatus, and, the communications server apparatus may, in response to receiving the data indicative of the response, in the one or more data records, generate, for the one or more event data fields, data indicative of a trust score corresponding to another authentication event defined by the authentication challenge and the response, and generate, for the one or more score data fields, data indicative of another security score based on the trust scores corresponding to the one or more authentication events and the trust score corresponding to the other authentication event, and authenticate the user if the other security score satisfies the condition for authentication corresponding to the transaction according to the value indicator.

For generating the security score, the communications server apparatus may generate data indicative of the security score based on the trust scores corresponding to all authentication events in the session.

The security score may be independent of authentication events in another session.

In the context of various embodiments, a user communications device may include, but not limited to, a smart phone, tablet, handheld/portable communications device, desktop or laptop computer, terminal computer, etc.

In the context of various embodiments, an "App" or an "application" may be installed on a user communications device and may include processor-executable instructions for execution on the device. As a non-limiting example, a user may make an authentication request and/or perform a transaction via an App.

The techniques disclosed herein may be suitable in a situation where the generation of the data indicative of the trust scores and the security scores may be carried out in a centralised manner and, which may be further stored in a centralised database, where applications or services may access the relevant data.

The techniques disclosed herein may also be suitable in a situation where some advanced or higher value applications or services (for example, where there may be higher security requirements) request for or obtain raw authentication events data of a login session to make customised authentication decisions by generating data indicative of the trust scores and the security scores in accordance with their own policies.

Various embodiments or techniques will now be further described in detail.

Figure 3:
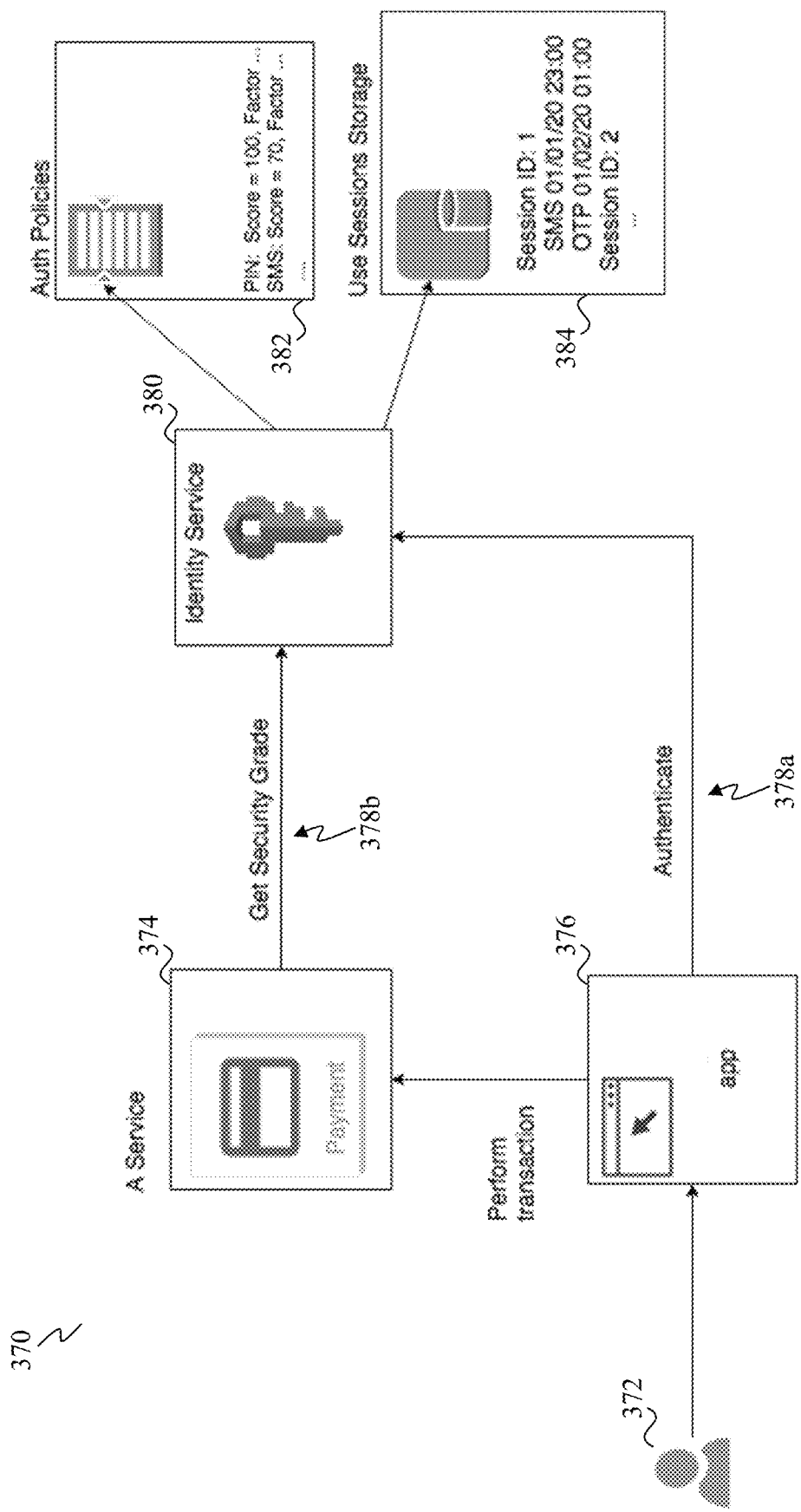
FIG. 3 shows a system for authentication, according to various embodiments.

FIG. 3 shows a system 370 for authentication, according to various embodiments.

A user 372 may wish to access a service 374, for example, relating to payment services, that may be provided or administered by or via a service provider. The user 372 may open or use a corresponding app 376, through which the user 372 may perform a transaction, such as making a payment, associated with the service 374. The app 376 may be offered or administered by the same service provider. As a non-limiting example, in the context of ride-hailing or ride-sharing transport services, the app 376 may refer to a passenger app and/or a driver app (i.e., an app in the communications device associated with a passenger and/or driver).

The user 372 may be required to perform one or more authentication challenges, (as indicated by the path marked as "378a"). This means that there is an authentication process that is carried out to verify the user 372 or the identity thereof. The one or more authentication challenges may involve, but not limited, to passwords, one-time passwords (OTPs) sent via SMS, PIN, biometrics, question/answer, etc, for example, a user entering a password at a particular time. As shown in FIG. 3, the authentication process may involve an "Identity Service" 380.

An "Identity Service" may refer to a service running in the cloud or on a premise that may be responsible for authentication, authorization and overall identity management of users. The Identity Service 380 may be part of a server. It can run on one or more machines, as part of a cloud deployment or enterprise. It may be a piece of software or part of a software that runs as a process that can run in a container, a virtual machine, on bare metal, etc.

Using the user 372 as an example (although it should be appreciated that the description below may be application to any users), authentication challenge(s) may be presented to the user 372 prior to the user 372 being able to access one or more services, including the service 374. Authentication challenge(s) may also be presented to the user 372 to allow the user 372 to continue accessing or using the one or more services, including the service 374. For example, if a predetermined or defined time has passed since a previous authentication challenge for the current authentication session, a further authentication challenge may be presented to the user 372 during the same authentication session so that the user 372 may continue using the service(s) upon successful performance of the further authentication challenge (i.e., completion of an authentication event).

The Identity Service 380 may store the authentication events completed by various users, including the user 372, in a session in a central repository, e.g., responses by the user 372 to the authentication challenges may be stored. These may include, for example, entering a PIN, receiving a one time passcode by SMS and entering it, etc. The "central repository" may refer to a data store, or a database, and may be located anywhere, e.g., as a part of cloud service like AWS (Amazon Web Services) or azure, or may even deployed directly in an enterprise (on premises). The Identity Service 380 may process the authentication challenges performed by the user 372 or the results thereof, and/or derive information or data on the basis of the authentication event completed by the user 372 or the results thereof. For example, the Identity Service 380 may assign a trust score to an authentication event that has been successfully completed or complied with by the user 382.

Using the service 374 as a non-limiting example, in trying to access the service 374 by the user 372, the service 374 may obtain the security score or grade (as indicated by the path marked as "378b"), from the Identity Service 380, corresponding to or associated with the user 372.

The Identity Service 380 may use a policy based mechanism (see "Authentication Policies" 382) for evaluating the security score based on accumulated authentication session data. One or more policies 382 may be provided to assign a numeric trust score and expiration strategy for each authentication event in a given session. The policies 382 may be provided as part of or within the Identity Service 380. A non-limiting example of a policy may require that a user must use his/her user name and password, and/or, in the last 2 hours, enter one of: PIN or SMS OTP challenge or biometric challenge.

The Identity Service 380 may be communicatively coupled to a storage 384, e.g., a Sessions Storage, which may store authentication session data, e.g., authentication data accumulated over one or more (login) sessions. The authentication data may be categorised or arranged according to the corresponding respective sessions (e.g., accumulated authentication data for a first (login) session, accumulated authentication data for a second (login) session, etc.).

The security score may be determined on the basis of the trust scores assigned to the authentication events accumulated over the session. A higher security score implies a higher security grade. A security grade may allow making of access control decisions. As a non-limiting example, in a situation where a user wishes to view credit card details, the user can do so with a security score having a value satisfying at least a threshold value (e.g., a value score of 0.7 or greater). Otherwise, the user is unable to view or access the credit card details. However, if the user still wishes to view the details, the user may attempt to increase the score by completing another authentication event, for example, by proving knowledge of a PIN for the account associated with the credit card.

The trust score to be assigned or determined for an authentication event may depend on one or more parameters such as time (e.g., when did the authentication event occur), the relative strength of the authentication mechanism (e.g., a 12-letter, well chosen password has a higher score compared to a challenge requiring the user to respond to a question relating to the user's last transport-related service with a particular service provider, such as the location of the last ride that the user took with the service provider).

The trust score assigned to each authentication challenge or event may degrade over time according to the expiration strategy specified by the policy 382. The trust score assigned may degrade differently for each authentication challenge or mechanism according to the expiration strategy specified by the policy 382. Degradation is provided for to take into consideration that a length of time has elapsed since the last authentication event, with undesirable event(s) or risk(s) potentially occurring during that time, which may result in the integrity of the session being compromised.

For example, having successfully performed an authentication challenge (such as entering a PIN) 12 hours ago, a user may have left the session unattended, and a third party may have taken over the session. As a non-limiting example of an expiration strategy, a PIN entered 12 hours ago may have 0 value, while a PIN entered 1 hour ago may have 0.5 value. The rate of degradation and/or the expiration strategy may be configurable and may vary with the relative strength of a given authentication mechanism.

Security scores may not be stored. A security grade may be dynamically computed or determined each time a caller asks (computed based on data recorded in the authentication session state) for it. Here, as a non-limiting example, the caller is the relying system (e.g., payment service 374) that calls the Identity Service 380 to get the security score for a given user's authentication session. Nevertheless, optimisations may be possible. For example, a possible optimisation may be that if no new authentication event has occurred in the last N minutes, cache may answer on the service side for n minutes instead of computing the security score. In greater detail, assuming that 1 minute ago, a security score was computed and returned to the requestor. Another request subsequently comes in 30 seconds later to get the security score for the user's session. The system or server can be configured such that the trust scores only degrade in time interval chunks, for example, 1 minute, meaning that an older security score response that was returned 30 seconds ago may still be valid. So, as an optimisation to not having to recompute the security score within this interval, the response or answer may be cached (e.g., by the Identity Service 380 which may be a redis cache). The cached value may have a TTL (time to live) after which it expires and is automatically deleted from the cache. So, as performance improvement or optimization, before re-computing the security score, the Identity Service 380 may do a cache look up to see if there is already a security score (and which may still be valid) in the cache. If the outcome is positive, the cached security score may be returned to the requestor. Otherwise, a fresh security score may be determined or computed and then returned to the requestor.

In various embodiments, one or more applications may rely on the security score calculated or determined by the Identity Service 380. "Applications" here may mean any software or service that cares about or may require authentication. These may include, but not limited to, a credit card service, a transport-related service booking service, a ride booking service, a payment service, etc.

Nevertheless, certain advanced applications or services may request raw authentication challenge history of a login session to make one or more custom authentication decisions. As a non-limiting example, a payment service may want to view all authentication events for a given user session, and make its own decision (based on its own policies) whether or not to give access, instead of relying on a score provided by the Identity Service 380. As a non-limiting example, such an advanced application may wish to have access to or obtain raw data pertaining to authentication events associated with a user, and use the raw data to compute the corresponding trust scores and security scores in accordance with its own policies. The raw authentication challenge history may refer to the entire log, including, for example, every authentication event <thumbprint, date>, <pin_challenge, date>, etc., the session state. The raw authentication challenge history may be requested from the Identity Service 380.

In greater detail, using a payment service as the example, the payment service may decide to use its own algorithm when computing security scores, that for instance, due to security requirements of the payment service, the service may use more stringent criteria when computing the value of each authentication event. For example, events may expire after shorter periods. Also, the service may choose to not count or consider certain authentication events (e.g., events involving simple challenges or questions, e.g., questions about a user's ride booking history) in computing the security score as it may consider these events too weak. Further, the service may attach greater scores or values to certain combinations (e.g., password, followed by facial recognition). By supporting an interface that returns the entire raw record of all authentication events that occurred, the relying application with more stringent security requirements may be able to use its own algorithm to meet its requirements in determining the security scores.

As described above, the computed security grade, on the basis of the trust scores associated with authentication events, may be used to decide if the current authentication session remains strong enough to continue giving access to one or more target endpoint(s) to a user (e.g., like transfer funds), or to challenge the user for additional authentication.

As also described above, there are provided techniques that evaluate a user's authenticated state as it evolves over time. The authenticated state may change because of occurrence of new/further authentication events, decay in a value that is associated with an authentication event with progression of time, etc.

The techniques disclosed herein may support various types or classes of authentication events or mechanisms. These authentication events may update a central session state which may be used to reduce user friction. The security score computed may be used as input for additional authentication and type of transaction. For example, lower value transactions may be allowed for lower security score, but user may be prompted for additional challenges when performing a high value transaction; in both cases, the user is authenticated, but based on scenario, the user may be challenged differently. As the user answers or responds to these challenges, security score is enhanced at a central server.

The techniques disclosed herein may enable use of the same security score behaving differently based on higher value or lower value transactions, meaning that while a same security score (with a certain value) may be sufficient for authentication for a lower value transaction, the same security score (with the same value) may be insufficient for authentication for a higher value transaction. Further, the trust scores for computation of the security score may decay, depending on time and type of operation.

As compared to known methods, the techniques disclosed herein may accumulate authentication state over time on the service (server/cloud side) and may facilitate evaluation of current authentication strength of a given session to other services (e.g., represented by a score, that may degrade over time, as authentication events further back in the past lose value from security perspective).

Further, the techniques disclosed herein may allow independent services or applications to make their own evaluation, subject to their own risk criteria using raw data of the session (and not relying on a centralised score). Using the raw data corresponding to the authentication events, these services may determine the relevant trust scores and security scores based on their internal policies to make a decision on user authentication.

The techniques disclosed herein may facilitate the reduction of user friction due to authentication challenges, in that the techniques support recording of access decisions to target endpoints by risk evaluation services that take into account all the events that occurred in the lifetime of a session. Thus, based on the decision(s) recorded in the session, a passing grade (i.e., sufficient security score that satisfies authentication) means that the user may not need to be further challenged for an additional authentication event or mechanism. In this way, the techniques may improve user experience by not requesting authentication challenges if the user's session has enough proof of identity of the user.

The techniques disclosed herein may enable a decision about granting access to a resource, scenario or service to be made based on required level of authentication, type of challenges the user completed before and time when those challenges were completed.

It will be appreciated that the invention has been described by way of example only. Various modifications may be made to the techniques described herein without departing from the spirit and scope of the appended claims. The disclosed techniques comprise techniques which may be provided in a stand-alone manner, or in combination with one another. Therefore, features described with respect to one technique may also be presented in combination with another technique.

The invention claimed is:

1. A communications server apparatus, comprising:
a memory storing processor-executable instructions;
an input/output communication module to communicate over a communications network; and
a processor to execute the processor-executable instructions in the memory, to manage authentications for a lifecycle of a login session based on one or more authentication events that occur during the login session, to cause the communications server apparatus to:
generate, by the processor for each authentication event during the login session, data for one or more event data fields in one or more data records including the one or more event data fields and one or more score data fields, the data generated for the one or more event data fields being indicative of a trust score corresponding to each of the authentication events during the login session, wherein each authentication event includes a combination of an authentication challenge and a response to the authentication challenge, a login session begins in response to a user log in to at least one service provided by a service provider and terminates in response to a user log out of the at least one service the service provider, and each trust score degrades over time;
generate, by the processor during the login session, data for each of the one or more event data fields indicative of a degraded trust score for each trust score;
generate, by the processor for the one or more score data fields, data indicative of a security score based on an accumulation of the degraded trust scores of the one or more event data fields corresponding to the one or more authentication events during the login session;
identify, by the processor in response to receiving, via the input/output communication module, request data indicative of an authentication request for a requested transaction during the login session from a client communications device, a value indicator associated with the requested transaction during the login session;
authenticate, by the processor, the login session in response to the authentication request from the client communications device whether the security score satisfies a threshold condition for the login session based on the value indicator associated with the requested transaction, wherein security scores for satisfying the threshold condition are variable according to value indicators of transactions; and transmit, via the input/output communication module to at least the client communications device during the login session, data indicative of the authentication of the login session in response to the authentication request.

2. The communications server apparatus as claimed in claim 1, wherein, if the security score fails to satisfy the threshold condition for the authentication of the login session in response to the authentication request, the processor is further configured to cause the communications server apparatus to:

generate, by the processor, data indicative of a first authentication challenge for the requested request;

transmit, via the input/output communication module, the data indicative of the first authentication challenge for the requested request to the client communications device for a first response from the client communications device in reply to the first authentication challenge;

generate, by the processor, for the one or more event data fields in response to receiving data indicative of the first response to the first authentication challenge from the client communications device, data indicative of a second trust score corresponding to a second authentication event defined by the first authentication challenge and the first response;

generate, by the processor, for the one or more score data fields, data indicative of a second security score based on the trust scores in the one or more event data fields corresponding to the one or more authentication events during the login session and the trust score corresponding to the second authentication event during the login session; and authenticate the second authentication event during the login session if the second security score satisfies the condition for authentication corresponding to the second transaction based on the value indicator.

3. The communications server apparatus as claimed in claim 1, wherein the communications server apparatus is configured to generate, by the processor, data indicative of the security score based on the trust scores corresponding to all of the authentication events during the login session.

4. The communications server apparatus as claimed in claim 1, wherein the security score generated during the login session is generated independent of authentication events in another login session.

5. The communications server apparatus as claimed in claim 1, further configured to generate by the processor, for the one or more event data fields and for each authentication event during the login session, data indicative of a timestamp of the authentication event.

6. The communications server apparatus as claimed in claim 1, wherein the trust scores are generated differently for different types of authentication events.

7. The communications server apparatus as claimed in claim 1, wherein a rate of degradation for the trust score is different for different types of authentication events.

8. The communications server apparatus as claimed in claim 1, wherein the communications server apparatus is further configured to generate by the processor, for the one or more score data fields, data indicative of a validity period for the security score, the validity period defining a duration of time for which the security score remains valid.

9. The communications server apparatus as claimed in claim 8, wherein, in response to receiving, from the client communications device, request data indicative of a subsequent authentication request associated with the user corresponding to a subsequent transaction during the login session within the validity period, the communications server apparatus is further configured to:

retrieve, by the processor, the security score from the one or more score data fields; and authenticate, by the processor during the login session, the subsequent authentication request if the security score satisfies a condition for authentication corresponding to the subsequent transaction based on a value indicator of the subsequent trans action.

10. A computer-implemented method, performed in a communications server apparatus for managing authentications for a lifetime of a login session, the method comprising:

generating, by a processor of the communications server apparatus for each authentication event that occurs during a login session, data for one or more event data fields in one or more data records including the one or more event data fields and one or more score data fields, the data generated for the one or more event data fields being indicative of a trust score corresponding to each of the authentication events during the login session, wherein each authentication event includes a combination of an authentication challenge and a response to the authentication challenge, a login session begins in response to a user log in to at least one service provided by a service provider and terminates in response to a user log out of the at least one service provided by the service provider, and each trust score degrades over time;

generating, during the login session, data for each of the one or more event data fields indicative of a degraded trust score for each trust score;

generating, by the processor for the one or more score data fields, data indicative of a security score based on an accumulation of the degraded trust scores of the one or more event data fields corresponding to the one or more authentication events during the login session;

identify, by the processor in response to receiving, via an input/output communication module of the communications server apparatus, request data indicative of an authentication request for a requested transaction during the login session from a client communications device, a value indicator associated with the requested transaction during the login session;

authenticating, by the processor, the login session in response to the authentication request from the client communications device whether if the security score satisfies a threshold condition for the login session based on the value indicator associated with the requested transaction, wherein security scores for satisfying the threshold condition are variable according to value indicators of transactions; and transmitting, via the input/output communication module to at least the client communications device during the login session, data indicative of the authentication of the login session in response to the authentication request.

11. The method as claimed in claim 10, wherein, if the security score fails to satisfy the condition for authentication corresponding to the requested transaction, the method further comprises:
generating, by the processor, data indicative of a first authentication challenge for the requested request;
transmitting, by the processor via the input/output communication module, the data indicative of the first authentication challenge for the requested request to the client communications device for a first response from the client communications device in reply to the first authentication challenge;
generating, by the processor for the one or more event data fields in response to receiving data indicative of the first response to the first authentication challenge from the client communications device, data indicative of a second trust score corresponding to a second authentication event defined by the first authentication challenge and the first response;
generating, by the processor for the one or more score data fields, data indicative of a second security score based on the trust scores in the one or more event data fields corresponding to the one or more authentication events during the login session and the trust score corresponding to the second authentication event during the login session; and
authenticating, by the processor, the second authentication event during the login session if the second security score satisfies the condition for authentication corresponding to the second transaction based on the value indicator.

12. The method as claimed in claim 10, wherein generating the security score comprises generating, by the processor, data indicative of the security score based on the trust scores corresponding to all the authentication events during the login session.

13. The method as claimed in claim 10, wherein the security score generated during the login session is generated independent of authentication events in another login session.

14. The method as claimed in claim 10, further comprising generating, by the processor for the one or more event data fields and for each authentication event during the login session, data indicative of a timestamp of the authentication event.

15. The method as claimed in claim 10, wherein the trust scores are generated differently for different types of authentication events.

16. The method as claimed in claim 10, wherein a rate of degradation of the trust scores is generated differently for different types of authentication events.

17. The method as claimed in claim 10, further comprising generating, by the processor for the one or more score data fields, data indicative of a validity period for the security score, the validity period defining a duration of time for which the security score remains valid.

18. The method as claimed in claim 17, wherein, in response to receiving, from the client communications device, request data indicative of a subsequent authentication request associated with the user corresponding to a subsequent transaction in the session within the validity period, the method further comprises:
retrieving, by the processor, the security score from the one or more score data fields; and
authenticating, by the processor during the login session, the subsequent authentication request if the security score satisfies a condition for authentication corresponding to the subsequent transaction based on a value indicator of the subsequent transaction.

19. A non-transitory storage medium storing instructions, which when executed by a processor cause the processor to perform the method as claimed in claim 10.

20. A communications system for managing authentication of a user based on one or more authentication events in a login session, the system comprising:
communications network equipment;
at least one client communications device, the at least one client communications device comprising a first processor and a first memory and being configured, under control of the first processor, to execute first instructions stored in the first memory; and
a communications server apparatus, the communications server apparatus and the at least one client communications device cooperatively communicate with each other through the communications network equipment, the communications server apparatus comprising a second processor, a second memory, an input/output communication module to communicate over the communications network and being configured, under control of the second processor, to execute second instructions stored in the second memory to:
generate, by the second processor for one or more event data fields in one or more data records including the one or more event data fields and one or more score data fields, data indicative of a trust score corresponding to each of a respective authentication event during the login session, wherein each authentication event includes a combination of an authentication challenge and a response to the authentication challenge, the login session begins in response to a user log in to at least one service provided by a service provider and terminates in response to a user log out of the at least one service provided by the service provider, and each trust score degrades over time;
generate, by the second processor during the login session, data for each of the one or more event data fields indicative of a degraded trust score for each trust score;
generate, by the second processor for the one or more score data fields, data indicative of a security score based on an accumulation of the degraded trust scores of the one or more event data fields corresponding to the one or more authentication events during the login session;
identify, by the second processor in response to receiving, via the input/output communication module, request data indicative of an authentication request for a requested transaction during the login session from the at least one client communications device, a value indicator associated with the requested transaction during the login session;
authenticate, by the second processor, the login session in response to receiving the request data indicative of the authentication request from the at least one client communications device whether the security score satisfies a threshold condition for the login session based on the value indicator associated with the requested transaction, wherein security scores for satisfying the threshold condition are variable according to value indicators of transactions; and
transmit, to the at least one client communications device during the login session, data indicative of the authentication of during the login session in response to the authentication request.

21. The communications system as claimed in claim 20, wherein, if the security score fails to satisfy the threshold condition for the authentication of the login session in response to the authentication request, the communications server apparatus is configured to:
- generate, by the second processor, data indicative of a first authentication challenge for the request;
- transmit, by the via the input/output communication module, the data indicative of the first authentication challenge for the requested request to the at least one client communications device for a first response from the at least one client communications device in reply to the first authentication challenge;
- generate, by the second processor, for the one or more event data fields in response to receiving data indicative of the first response to the first authentication challenge from the at least one client communications device, data indicative of a second trust score corresponding to a second authentication event defined by the first authentication challenge and the first response;
- generate, by the second processor, for the one or more score data fields, data indicative of a second security score based on the trust scores in the one or more event data fields corresponding to the one or more authentication events during the login session and the trust score corresponding to the second authentication event during the login session; and
- authenticate, by the second processor, the second authentication event during the login session if the second security score satisfies the condition for authentication corresponding to the second transaction based on the value indicator.

22. The communications system as claimed in claim 20, wherein the communications server apparatus is configured to generate, by the second processor, data indicative of the security score based on the trust scores corresponding to all of the authentication events during the login session.

23. The communications system as claimed in claim 20, wherein the security generated during the login session is generated independent of authentication events in another login session.

* * * * *